(12) United States Patent
Fragnoli

(10) Patent No.: US 8,613,154 B2
(45) Date of Patent: Dec. 24, 2013

(54) PROCESS FOR MAKING A DEVICE FOR SECURING IDENTIFICATION

(76) Inventor: Kathy Fragnoli, Dallas, TX (US)

(*) Notice: Subject to any disclaimer, the term of this patent is extended or adjusted under 35 U.S.C. 154(b) by 0 days.

(21) Appl. No.: 13/429,394

(22) Filed: Mar. 25, 2012

(65) Prior Publication Data

US 2013/0075028 A1   Mar. 28, 2013

Related U.S. Application Data

(60) Division of application No. 12/319,502, filed on Jan. 8, 2009, now Pat. No. 8,166,688, which is a continuation-in-part of application No. 11/820,419, filed on Jun. 19, 2007, now abandoned.

(51) Int. Cl.
*G09F 3/18* (2006.01)
*G09F 3/00* (2006.01)

(52) U.S. Cl.
USPC ............ 40/661; 40/654.01; 428/40.1; 283/81

(58) Field of Classification Search
USPC .................................. 40/661; 428/40.1; 283/81
See application file for complete search history.

(56) References Cited

U.S. PATENT DOCUMENTS

| | | | | |
|---|---|---|---|---|
| 4,413,434 A | * | 11/1983 | Rupert et al. ................... | 40/661 |
| 6,079,189 A | * | 6/2000 | Sloot .............................. | 53/453 |
| 6,623,039 B2 | * | 9/2003 | Thompson et al. ............ | 283/61 |

* cited by examiner

*Primary Examiner* — Syed A Islam
(74) *Attorney, Agent, or Firm* — Jeffrey Roddy

(57) ABSTRACT

A method for producing multiple devices for securing identification means to a mounting surface includes a mounting device having a upper surface of translucent plastic film having certain regions glued to a substrate of label stock beneath the film. A gap with opening between the label stock and the film forms a pocket into which an identification means may be inserted or removed. The label stock possesses a face having an adhesive coating which is exposed by a peel-away backing. An image area printed on the label stock prior to application of the plastic film overlay is visible through the pocket and up to the outer edges of each mounting device. The device is economically created in multiples using adhesive label stock in either roll or sheet form.

3 Claims, 3 Drawing Sheets

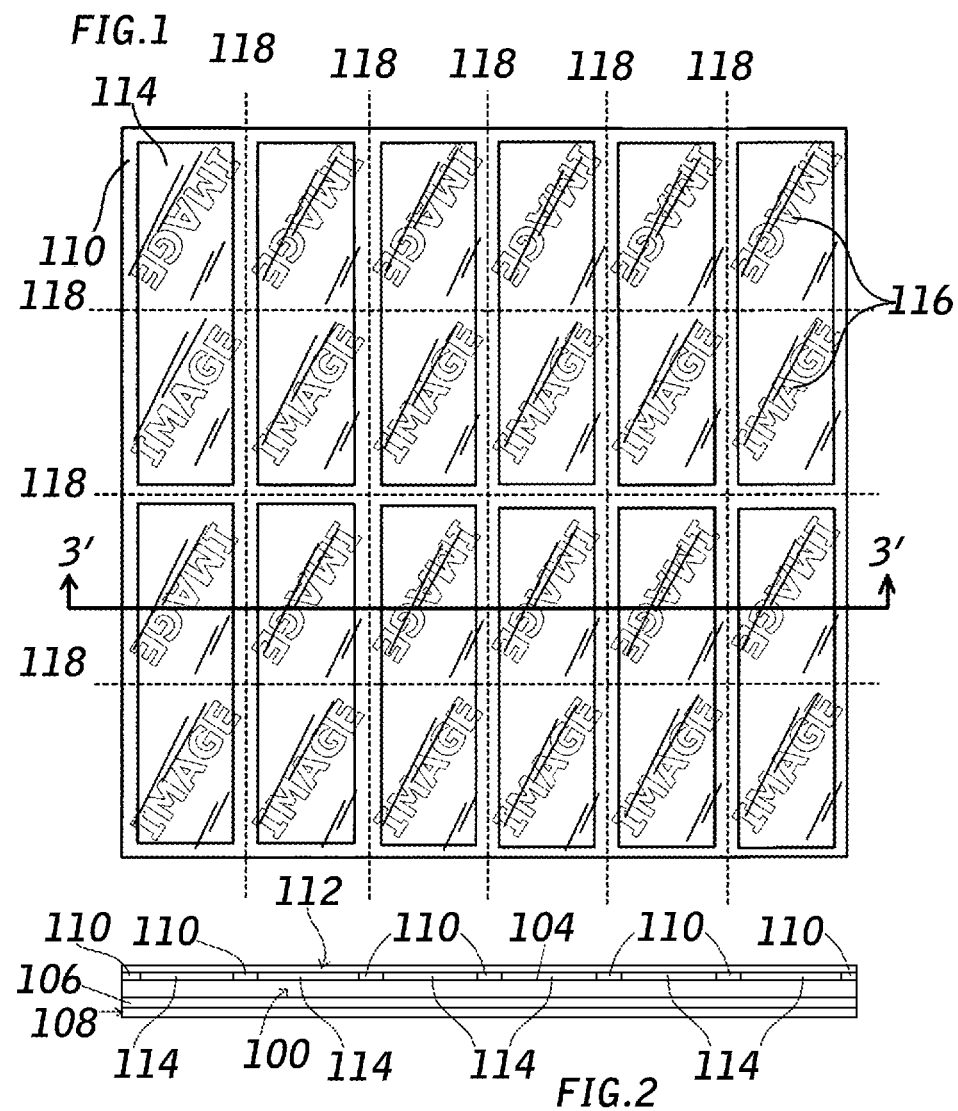

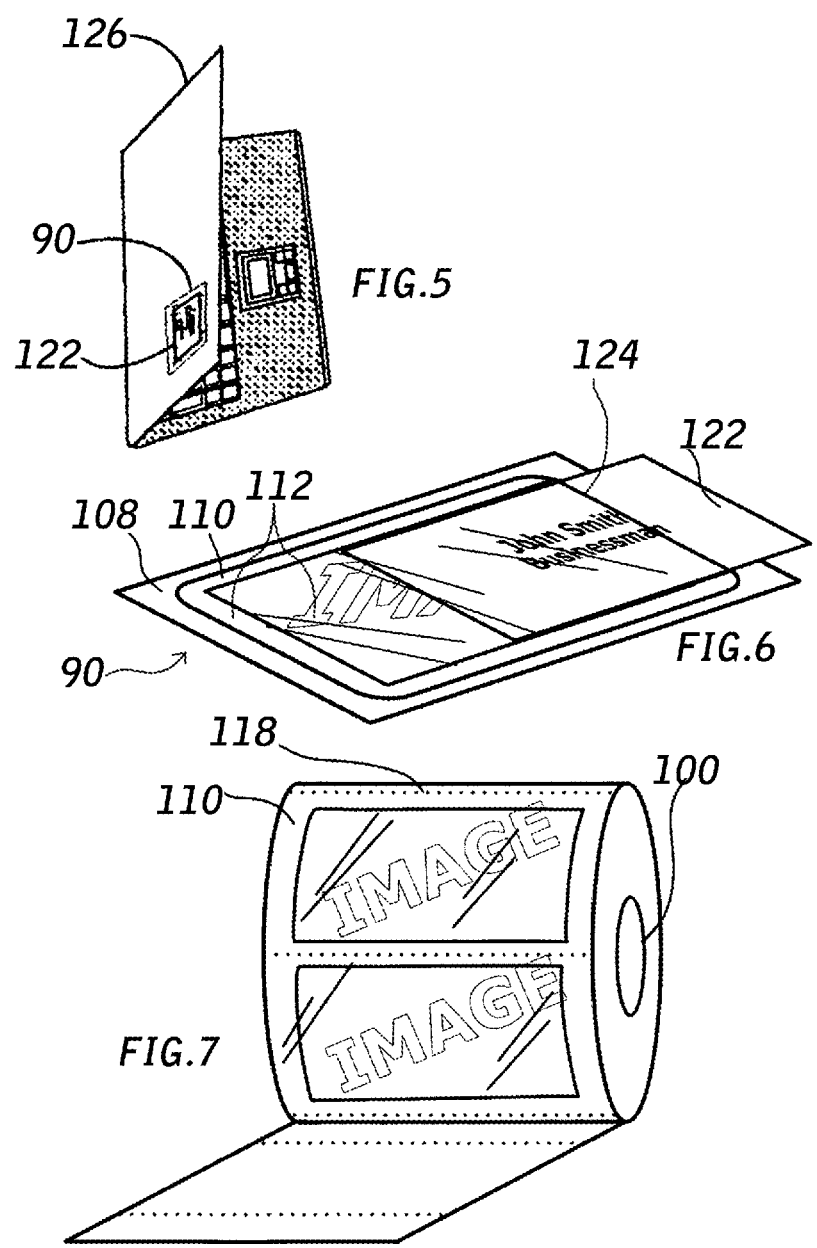

PROCESS FOR MAKING A DEVICE FOR SECURING IDENTIFICATION

CROSS REFERENCE TO RELATED APPLICATIONS

This is a Divisional Application of U.S. patent application Ser. No. 12/319,502 filed Jan. 8, 2009 now U.S. Pat. No. 8,166,688 which is a Continuation in Part of U.S. patent application Ser. No. 11/820,419 filed Jun. 19, 2007 now abandoned.

STATEMENT REGARDING FEDERALLY SPONSORED RESEARCH OR DEVELOPMENT

Not applicable

THE NAMES OF THE PARTIES TO A JOINT RESEARCH AGREEMENT

Not applicable

INCORPORATION-BY-REFERENCE OF MATERIAL SUBMITTED ON A COMPACT DISC

Not applicable

BACKGROUND OF THE INVENTION

This invention relates generally to a process for producing printed articles with sleeves en masse, and more specifically, a process that uses extant printing house technology for producing a printed article with a sleeve which can be removably affixed to a mounting surface and into which a means of identification such as a business card or distinctive logo can be inserted. The business card or the like is readily removable from the sleeve, but when placed therein, is visible through the sleeve for advertising or identification purposes.

Personal items such as mobile telephones, personal digital assistants (PDAs), laptop computers, documents, brochures, and portfolios are often generic in appearance. Mistakes in the identity of the owner of such a device may occur and an unintended person may pick up the wrong device if the owner is not clearly identified. Such personal devices are frequently small and may be overlooked when the owner leaves a public area such as an airport check-in or a conference room. The generic appearance of personal devices may hinder the owner's ability to locate the device or a finder's efforts to locate the owner if the identity of the owner is not obvious.

Brochures, portfolios and similar articles are often used to deliver a message or to provide information from a person who desires to be readily identified by the recipient of the message. For at least the reason that staples, paper clips and tape result in a sloppy appearance and can damage the identifying article or mounting surface, it would be desirable to secure a business card or other form of identification to articles without defacing the same by providing an identifying device which can be readily removed and separately stored.

SUMMARY OF THE INVENTION

The process according to the present invention set forth in this disclosure employs existing extant printing house machinery and materials to produce multiples of an article intended to be used inter alia for messaging and identification purposes. The identification means produced in the process includes a device having an elongated sleeve with a front surface, a rear surface and a perimeter, and in which the front surface is joined to the rear surface by at least a portion of the perimeter forming a pocket therebetween with at least one opening between the front surface and the rear surface defining a passageway into the pocket. An adhesive coating on the back of the rear surface removably adheres the sleeved device to a mounting surface such as a laptop. The sleeved device provides at least (1) a means for removably securing identification means to a mounting surface of an article such as a personal device or brochure which will not damage the identification means or the mounting surface when the identification means is removed, and (2) a message or advertisement conveyed by image(s) applied during the production process.

BRIEF DESCRIPTION OF THE DRAWINGS

For a more complete understanding of the features and advantages of the present invention, reference is now made to the detailed description of the invention along with the accompanying figures in which corresponding numerals in the different figures refer to corresponding parts.

FIG. 1 is a plan view representative a step in a process for producing plural sleeved devices including a sheet of adhesive label stock with a laminated clear covering;

FIG. 2 is a cross-sectional view taken along lines 3'-3' of the sheet depicted in FIG. 1;

FIG. 5 is a perspective view of single sleeved device in a typical use setting;

FIG. 6 is an enlarged perspective view of a single sleeved device;

FIG. 7 is a perspective view one embodiment according to the present invention comprising a roll of sleeved devices.

DESCRIPTION OF THE PREFERRED EMBODIMENTS

Figure 3:
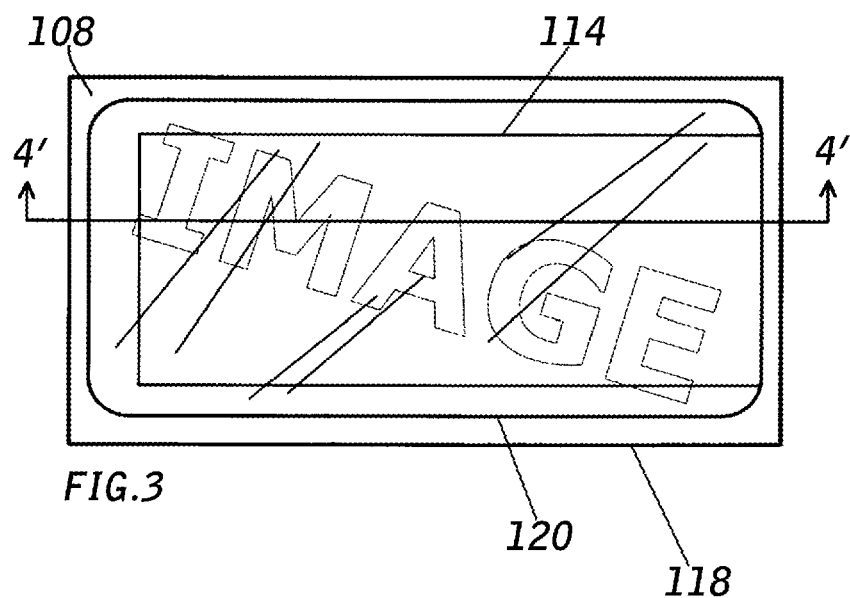
FIG. 3 is a plan view of a single finished sleeved device having been die cut and separated from the sheet shown in FIG. 1.

In the following description, numerous details are set forth to provide an understanding of the present invention. Those skilled in the relevant art will comprehend that the present invention may be practiced without these details and that numerous variations or modifications from the described embodiments may be possible. Accordingly, the materials, methods, and examples are illustrative only and not intended to be limiting. Unless otherwise explained, any technical terms used herein have the same meaning as commonly understood by one of ordinary skill in the art to which this disclosure belongs. The term "die-cutting" refers to any process that employs a die to separate or demarcate a section of material from another. The term "kiss-cut" refers to a type or degree of die-cutting wherein a section of material is not cut all the way through. The terms "sleeve" or "pocket" can be used interchangeably depending on the open or closed state of the pocket at various times within the disclosed process. The term "image" refers to any kind of marking applied at any point in the disclosed production process to the sleeved device whether textual or decorative. The singular terms "a," "an," and "the" include plural referents unless the context clearly indicates otherwise. Similarly, the word "or" is intended to include "and" unless the context clearly indicates otherwise. The term "comprises" means "includes." Although methods and materials similar or equivalent to those described herein can be used in the practice or testing of this disclosure, suitable methods and materials are described below. Publications, patent applications, patents, and other references mentioned herein, if any, are incorporated by reference in their entirety for all purposes. In case of conflict, the present specification, including explanations of terms, will control.

REFERENCE CHARACTER LISTING 90 device
100 substrate
102 top face
104 bottom face
106 adhesive
108 backing
110 adhesive pattern
112 plastic film
114 pocket
116 image
118 separation lines
120 kiss-cut
122 insertable identification
124 sleeve opening
126 mounting surface Referring generally to FIGS. 1-7; a sleeved device 90 with identification means is produced in multiples by obtaining adhesive label stock including a substrate 100 having a printable top face 102 and a back side; or bottom face 104 coated with a pressure sensitive removable adhesive 106 which is preferably an emulsion-type acrylic adhesive with minimal building of adhesion over time. While label stock such as 3M Polyester Label Material 5771 or 5771NF with 3M removable adhesive 550 offer a gloss white polyester face paired with a peel away backing such as kraft paper or a polyester backing with excellent water repellant characteristics, any coated label stock with a peel away backing 108 exposing a pressure sensitive adhesive that is non-marring and removable, may be used if susceptibility to moisture damage is not a major concern.

A predetermined pattern of applied adhesive 110 which is preferably a UV curing type, is either rolled or screen printed upon the face 102, and a layer of translucent plastic film 112, or polyester film is applied to face 102 where it selectively adheres to the predetermined pattern of applied adhesive 110 after exposing to UV light and forms a series of pockets 114 which are initially closed, with portions of the plastic film bonded to the adhesive pattern defining the bounds of the pockets. The laminate of plastic film 112 and substrate is then die cut by kiss-cutting to the backing 108 to delimit device size and open at least one end of each pocket 114 to produce a sleeve. Subsequent die cutting, perforating or slitting separates the multiple devices on the sheet or roll, into individual devices and creates a periphery of disposable material between the kiss-cut and the separation line 118 that when discarded exposes a periphery of peel away backing which is removed to expose the adhesive coating of the label stock prior to adhering the device to a mounting surface.

Application of Indicia

Figure 4:
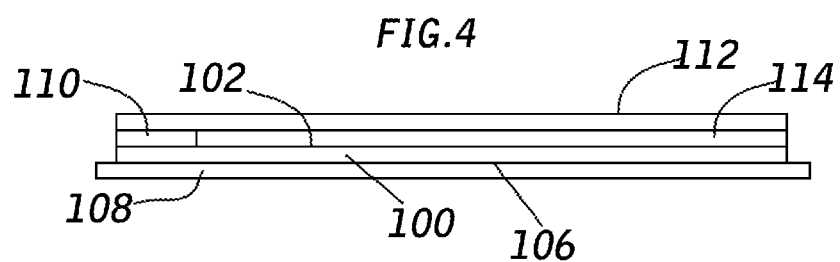
FIG. 4 is a cross-sectional view taken along lines 4'-4' of the sleeved device depicted in FIG. 3.

Normally, printing on the top face 102 of the label stock occurs prior to application of the predetermined pattern of applied adhesive 110 and the adhering of plastic film 112 to face 102. The plastic film may be in sheet form, or roll form, and applied as a secondary web to the primary web of the substrate by a roll die cutter which is often paired with laminating functions. FIG. 2 shows a cross-sectional view taken along lines 3'-3' of FIG. 1 that shows a sheet containing multiple devices with thickness of the materials exaggerated for clarity. Moving from the top of the figure to the bottom is the plastic overlay 112, pockets 114 formed between a pattern of adhesive 110, printable top face 102 of substrate 100, rear adhesive layer 106 and peel away backing 108. FIG. 3 is a plan view of one of the devices after separation from the sheet. The image area 116 printed on the top face 102 of the substrate can extend beyond the pocket to a region outside of the pocket bounds to edge 120 produced by kiss-cutting. FIG. 4 is a cross-sectional view taken along lines 4'-4' of the individual device depicted in FIG. 3 showing plastic film overlay 112, adhesive pattern 110, pocket 114 which has been opened at an end 124, printable top face 102 of substrate 100, and bottom face 104 of substrate 100 in which the size of the elements has again been exaggerated for clarity. FIG. 5 shows a single device 90 affixed to the lid of a lap top. FIG. 6 shows a single device 90 showing an identification means; here a card 122, being inserted into the mouth 124 of pocket 114. Note that the plastic film is attached only to the border of adhesive which also defines the internal bounds of the pocket.

While offset printing is the preferred means of printing on top face 102, other common processes such as xerography, thermal transfer, or laser printing can be used without diverging from the present invention.

Any multiple of the mounting devices may be produced quickly and efficiently using conventional print process machinery by the described process. As will be appreciated by those skilled in the art, the order of operations as given below can be varied somewhat to derive the mounting devices. Accordingly, the specific examples discussed below are merely exemplary and should not be construed as limiting the scope of the present invention.

EXAMPLE ONE

In order to produce a series of sleeved devices, each providing an identification securing means according to the present invention in which a mounting means secures, for example, a business card for display, the following steps are followed:
(1) a substrate 100 of suitable adhesive blank label stock is obtained,
(2) a printing press is used to print a plurality of images 116 in which each image is reversed relative of the other,
(3) a UV curable adhesive such as Lomaprint SPA 1000 from Lohmann GmbH & Co KG of Neuwied Germany, is applied by screen printing or other printing means to top face 102 of the substrate in a predetermined pattern 110 defining borders around the image pairs,
(4) a layer of transparent material film such as cellophane or clear polyester film (PET) is applied over face 102 and laminated thereon.
(5) the printed and laminated sheet stock is conveyed to a UV light curing area which adheres the clear film to the adhesive pattern whereby initially closed pocket 114 is formed over the image pair and adhered about its periphery to face 102,
(6) a roll die cut machine is used to define the edges of each mounting device by kiss-cutting through the face to backing material 108, thereby bisecting the pocket over the image pairs to open the pockets 114 creating multiple sleeve pairs, and, leaves a peel away border of excess face material about the periphery of each mounting device,
(7) individual mounting devices are separated from the sheet by shearing, cutting or slitting along dashed lines 119 along the defined borders 120 or a series of perforations may be applied in the areas between sheet carried mounting devices for later separation.

EXAMPLE TWO (1) a substrate 100 of adhesive blank label stock in roll form is obtained,
(2) the label stock is printed on a flexographic press, with areas corresponding to the location of mounting devices being printed with images,
(3) a UV curable adhesive is applied to the roll in a pattern 110 which will define the inside boundaries of a pocket,
(4) a clear polyester film 112 is applied continuously to the roll,
(5) the printed and laminated stock is conveyed to a UV light curing area adhering the polyester film to the adhesive pattern on face 102 forming a sleeve 114 with an opening along one end over the printed image and adhered along the sleeve periphery to the face,
(6) a roll die cutting machine is used to define edges of each mounting device and creates a border of discardable material about the periphery of the mounting device,
(7) the mounting devices may be separated or otherwise demarcated from the sheet by shearing, cutting, slitting, or perforated along dashed lines 119 between the mounting devices.

Referring to FIGS. 3, 4 and 6, once separated from the sheet or roll, the mounting devices include a top overlay 112 with portions attached to the adhesive border 110, and positioned flatly to top face 102 with an opening 124 therebetween for the insertion of an identification device 122 such as a business card or other identification tag.

The mounting device produced by the disclosed method may have any number of sides comprising its perimeter defined by the kiss-cut border 120 which can be a variety of shapes.

The mounting device produced by the disclosed method may have any number of openings for insertion of an insertable identification 122 such as a business card or logo.

The front face of the mounting device produced by the disclosed method may possess an ornate design.

The front face of the mounting device produced by the disclosed method may be printed with words, letters, numbers. symbols or any combination of characters and/or designs.

Mounting devices produced by the disclosed method can be attached to surfaces such as a laptops computers, portfolios, personal digital assistants (PDAs), and documents or the like.

Mounting devices produced by the disclosed method can be supplied individually with a peel away backing material 108 that is removably adhered to the adhesive of the label stock.

Although this invention has been described above with reference to particular means, materials and embodiments, it is intended that the invention be not limited to the particular embodiments described, but extend instead to all equivalents falling within the scope and spirit of the following claims.

What is claimed is:

1. A method for producing multiple mounting devices for the securing of identification means to various surfaces comprising the steps of:
    (1) obtaining a substrate of blank label stock having a top side, a rear side covered with adhesive opposite the top side, and a peel away backing,
    (2) on the top side, printing a plurality of image areas and applying an adhesive in a predetermined pattern,
    (3) adhering a translucent plastic overlay to the predetermined pattern of adhesive forming a plurality of enclosed pockets with boundaries,
    (4) kiss-cutting through the overlay to the backing in order to demarcate multiple devices each having at least an outer edge, an open pocket and an image area,
    (5) separating the kiss-cut label stock into individual mounting devices each having a discard-able border that when discarded reveals the peel away backing around the image area.

2. The method according to claim 1, in which each image area is visible beyond the boundaries of the pockets.

3. The method according to claim 1, which a portion of the translucent plastic film overlay is selectively adhered to portions of the top side bordering the pocket.

* * * * *